July 28, 1953  W. F. STREHLOW  2,646,849
BELT PULLEY ATTACHMENT
Filed Aug. 20, 1949

Inventor
Walter F. Strehlow
James J. Coffee
Attorney

Patented July 28, 1953

2,646,849

UNITED STATES PATENT OFFICE 2,646,849

BELT PULLEY ATTACHMENT

Walter F. Strehlow, Wauwatosa, Wis., assignor to Allis-Chalmers Manufacturing Company, Milwaukee, Wis., a corporation of Delaware Application August 20, 1949, Serial No. 111,370

4 Claims. (Cl. 180—53)

This invention relates generally to vehicles and is more particularly concerned with a power take-off in the form of a belt pulley attachment for agricultural tractors.

Although belt pulley attachments for farm tractors have proven useful in many ways, they are generally a nuisance when not in use. The projecting shaft and pulley not only present a real hazard to safe tractor operation, particularly if constantly driven directly from the engine, but they are generally an impediment to the mounting of tools on the tractor. Several ways have been devised for either removing the pulley or the pulley and its supporting shaft but none have been entirely satisfactory. If only the pulley is removed additional space is thereby afforded for mounting tools on the tractor, but the risk to the operator is also increased since the pulley shaft is thereby exposed. The removal of both the pulley and shaft is, of course, most desirable but this too offers additional problems. The pulley shaft housing may be partially filled with oil and, therefore, this oil must be drained before removing the shaft and then later returned to the housing. Moreover, some covering means must be provided for the shaft receiving opening in the housing in order to prevent dirt from entering the housing.

It is a primary object of this invention to provide an improved belt pulley attachment comprising parts constructed and arranged in a novel manner affording easy separation of the belt pulley from its drive shaft without thereby exposing a projecting shaft portion.

Another object of the present invention is to provide a belt pulley attachment in combination with a frame type tractor wherein said attachment affords removal of the belt pulley from its drive shaft at the point of juncture of said shaft with the outer surface of the tractor frame.

Figure 2:
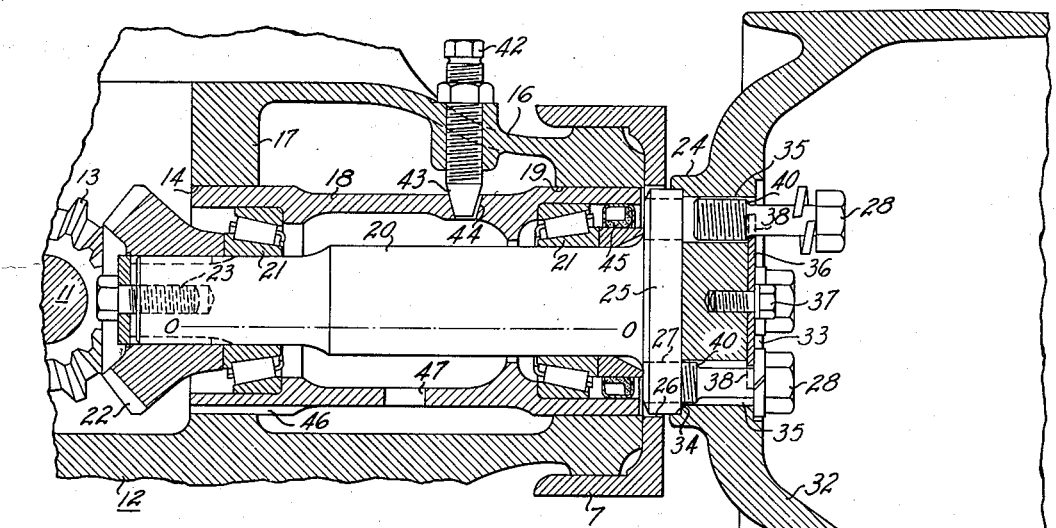
Figure 1:
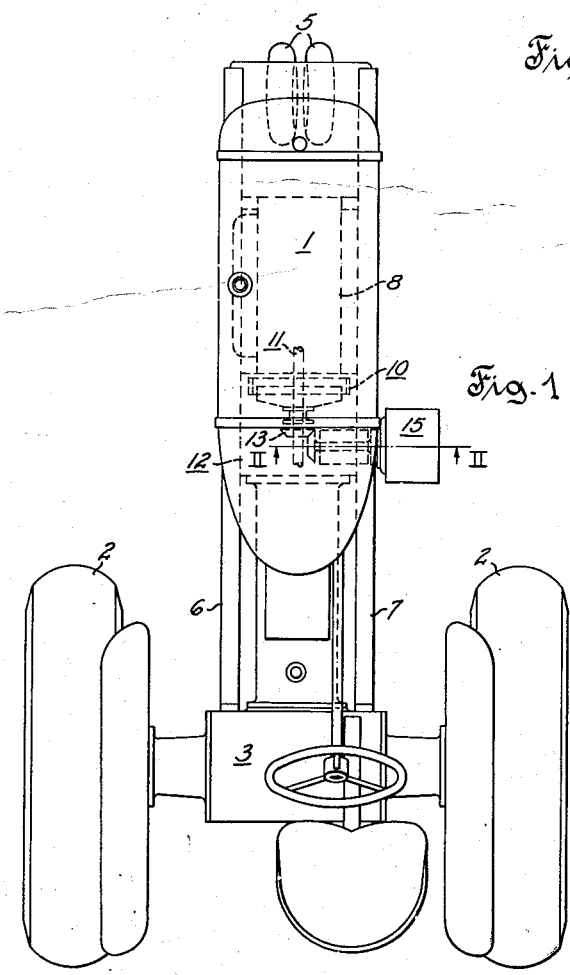

And accordingly the present invention may be considered as comprising the various constructions and combinations hereinafter more particularly pointed out in the detailed description and claims, reference being had to the accompanying drawings illustrating but one embodiment of the invention, and in which:

Fig. 1 is a plan view of a tractor illustrating an embodiment of the invention; and Fig. 2 is an enlarged sectional view taken along line II—II in Fig. 1.

Referring to Fig. 1 it will be seen that apparatus chosen to illustrate the present invention comprises a tractor 1 having a pair of driving wheels 2 mounted at opposite ends of a rear axle structure 3 and a pair of dirigible front wheels 5 affording traveling support for a frame structure comprising a pair of laterally spaced channel members 6 and 7. Mounted forwardly on the tractor in supported relation to the frame members is a conventional type power unit 8 having operable connection with rear driving wheels 2 through means of a clutch mechanism 10, drive shaft 11 and suitable transmission and differential mechanism (not shown).

Clutch mechanism 10 and the forward portion of drive shaft 11 are enclosed in a clutch housing 12 immediately in rear of the engine or power unit 8 and this forward portion of the drive shaft has nonrotatably fixed thereto a bevel drive gear 13 providing means for delivering power to an external source such as belt pulley 15. And looking particularly at Fig. 2 it is seen that clutch housing 12 includes a laterally projecting tapered portion 16 disposed at its outer end in bearing relation to the oppositely facing inner flange surfaces of side frame member 7. Housing portion 16 includes a web 17 near the inner end thereof which has a transverse opening 14 therethrough opposite bevel gear 13. This opening is axially aligned with a similar opening 19 through the outer end of housing portion 16 and a cylindrical sleeve like part 18 is slidably inserted through these aligned openings in axially adjustable fixed relation thereto and a pulley shaft 20 is rotatably supported in sleeve 18 through suitable axially spaced bearing means 21. The inner end of shaft 20 is splined to receive an internally splined hub portion of a bevel gear 22 detachably fixed thereon, as by cap screw 23, in position for meshing engagement with bevel gear 13. The opposite or outer end of shaft 20 terminates in a radially flanged portion 25 disposed within an opening 26 in side frame member 7 and projecting slightly therebeyond. And in this connection it should be noted that it is merely a matter of choice in design as to whether the radial end surface of flange 25 is made flush with the outer side surface of the tractor frame member 7 or projects outwardly therebeyond a slight distance. The radially outward extending flange 25 is sufficiently thick to provide the required strength of material and also to project somewhat beyond the hollow body structure of the tractor which includes the housing 12 and the side channel 7. As will be discussed more fully hereinbelow, means are provided for readily coupling to the flange 25 a complementary recessed portion 34 of a pulley hub 24 in axial alignment therewith. Furthermore, in the illustrated embodiment the flange portion of the pulley shaft has been made with a diameter such that the side opening 26 in the hollow body structure of the tractor is equal to or greater than the outside diameter of sleeve 18 in order that the latter may be readily withdrawn from the clutch housing when it becomes necessary to replace any part of the belt pulley assembly disposed within the housing.

Flange portion 25 of shaft 20 has a series of circumferentially spaced transverse openings 27 therethrough which are threaded to receive bolts 28 or the like, for securing pulley 15 in fixed relation thereto. More particularly, belt pulley 15 comprises a generally cylindrical flange portion or rim 31, a web portion 32 disposed in offset relation with respect to the center line of flange 31 and a hub 24 having a series of circumferentially spaced openings 35 therethrough alignable with openings 27 in the flange on the outer end of the pulley shaft and having cap screws 28 positioned in each of the openings 35. In order to prevent axial displacement of cap screws 28 relative to hub 24 there is provided a plate member 36 which is detachably secured to a recessed portion 33 of the outer face of hub 24 by any suitable means such as cap screw 37. Circular plate member 36 has slotted or cut out portions 38 along the periphery thereof in spaced relation with respect to each other similar to the spacing of openings 35 in the hub, and these cut out portions coact with the shoulder 40 formed on each screw 28 to prevent axial movement thereof beyond plate 36. Consequently, screws 28 may be withdrawn from openings 27 but cannot be entirely removed from openings 35 in the hub without first removing cap screw 37 and plate 36.

In a belt pulley attachment of the type described it is desirable to provide some means for axially adjusting the pulley shaft in order to properly align the teeth of the bevel gear on the inner end thereof with those of the drive shaft gear. And to achieve this adjustment there is provided a set screw 42 which is positionable in a generally vertical threaded opening in the upper surface of housing portion 16. Screw 42 has a tapered end portion 43 coacting with a similarly tapered opening 44 in sleeve 18 to axially move the latter with respect to housing 16 upon adjustment of the set screw. And, of course, axial movement of sleeve 18 results in a corresponding movement of pulley shaft 20 and gear 22 to adjust the line of mesh between the latter and drive gear 13.

Moreover, since it is frequently desirable to have lubricant in the drive shaft housing to a relatively high level, such as 0—0, in order to properly lubricate the moving parts therein and also to provide sufficient lubricant for operation of a hydraulic pump (not shown) driven by the drive shaft, there is provided an oil seal 45 at the outer end of shaft 20 to prevent escape of oil through side opening 26. And, in this connection, a slot or passage 46 has been formed along the inner end of sleeve 18 to permit oil to flow from the central portion of clutch housing 12 into housing portion 16, and an opening 47 in the lower side of sleeve 18 affords communication between housing portion 16 and the inside of sleeve 18. Consequently, oil is circulated from the central portion of housing 12 into housing portion 16 and then into sleeve 18 from which it may flow through bearing means 21 back to the portion of housing 12 enclosing drive shaft 11.

Thus it is seen that apparatus constructed in accordance with the present invention affords a belt pulley assembly which permits the removal of the pulley from the shaft without exposing dangerous revolvable parts. Furthermore, in so providing this structure there is eliminated any need for removal of the pulley shaft and, consequently, for draining oil from the tractor housing containing the pulley shaft.

In general terms, the web of the frame channel 7 represents an apertured wall member which forms part of the tractor main body and which presents a side opening, namely the opening 26, for mounting the belt pulley attachment on the tractor. The bearing openings 14 and 19, together with the set screw 42 and cooperating parts, represent means for securing the sleeve 18 within the tractor main body at substantially right angles to the mentioned apertured wall member and in coaxial, laterally offset relation to the side opening 26 so as to provide an internal space within the tractor main body between the axially outer edge of the side opening 26 and the end face of the sleeve 18 next to the web of the channel 7, as clearly shown in Fig. 2. The end flange 25 of the belt pulley drive shaft 20 is positioned within said internal space of the tractor main body, and the end flange 25 is substantially coextensive, diametrically, with the side opening 26. At its axially outer side, the end flange 25 terminates in proximity to the outer side of the mentioned apertured wall member; and means, including the cap screws 28, are provided for detachably securing the belt pulley 15 to the end flange 25 in an operative position externally of the tractor main body.

And although illustrated and described as applied to a belt pulley attachment for a frame type tractor it is not intended to thereby limit the invention to the exact constructions and combinations shown as various other modifications within the scope of the appended claims may occur to persons skilled in the art.

It is claimed and desired to secure by Letters Patent:

1. In a tractor having a side frame member having a transverse opening therethrough, a belt pulley attachment comprising a sleeve disposed at a right angle to said frame member and extending inwardly therefrom in axial alignment with said opening, a shaft rotatably mounted in said sleeve and terminating at one end in a circular flange element presenting a plane outer surface substantially closing said opening, a pulley having a hub portion projecting axially outside the rim of said pulley, and removable means detachably connecting said pulley to said plane outer surface of said flange element so that removal of said pulley and removable means exposes a practically continuous plane surface along the outer side of said frame member.

2. In a tractor having laterally spaced side frame members connecting front and rear portions thereof, and a power unit and drive shaft disposed between said side frame members, said power unit including a housing having a portion thereof disposed in bearing relation with one of said side frame members for support thereon and having an opening therethrough coaxial with respect to a similar opening through said one side frame member, the combination of a belt pulley attachment comprising a sleeve disposed within said housing in axial alignment with said openings and generally at a right angle with respect to said one side frame member, a power shaft rotatably mounted in said sleeve and terminating in a circular flange element substantially closing said opening in said one side frame member and presenting a plane outer surface, a belt pulley having a hub portion projecting axially outside the rim of said pulley, removable means detachably connecting said belt pulley to said plane outer surface of said flange element so that removal of said belt pulley and removable means exposes a practically continuous plane surface along said one side frame member, and means on the other end of said power shaft for operably connecting same in driven relation with said drive shaft.

3. In a tractor having laterally spaced channel frame members connecting front and rear portions thereof with a power unit and drive shaft disposed between said frame members, said frame members disposed with the channel portions thereof facing each other, said power unit including a drive shaft housing having a portion thereof disposed in supported bearing relation with the lower flange portion of one of said frame members, and said housing portion having an opening therethrough coaxial with respect to a similar opening through said one side frame member, the combination of a belt pulley attachment comprising a sleeve disposed within said housing in coaxial alignment with said openings in said housing and said one frame member, a power shaft rotatably mounted in said sleeve and terminating in a circular flange element substantially closing said opening in said side frame member and presenting a plane outer surface, a belt pulley having a hub portion projecting axially outside the rim of said pulley, removable means for detachably securing said hub to said flange element so that removal of said belt pulley and removable means exposes a practically continuous plane outer surface along said one side frame member, and additional means on the other end of said power shaft for operably connecting same in driven relation with said drive shaft, said flange element, sleeve and additional means each having an external diameter smaller than the inside diameter of said coaxial openings whereby said power shaft, sleeve and additional means may be axially moved as a unit through said coaxial openings.

4. In a tractor, the combination of an apertured wall member forming part of the tractor main body and presenting a side opening for mounting a belt pulley attachment on said tractor, a sleeve forming part of said attachment and insertable endwise into and withdrawable from said main body through said side opening, means for securing said sleeve within said main body at substantially right angles to said wall member and in coaxial, laterally offset relation to said side opening so as to provide an internal space within said main body between the axially outer edge of said side opening and the end face of said sleeve next to said wall member, a pulley drive shaft rotatably mounted in axially fixed position within said sleeve and having an end flange within said internal space of said tractor main body, said end flange being substantially coextensive, diametrically, with said side opening and terminating at its axially outer side in proximity to the outer side of said wall member; and means for detachably securing a belt pulley to said end flange in an operative position externally of said tractor main body.

WALTER F. STREHLOW.

References Cited in the file of this patent

UNITED STATES PATENTS

| Number | Name | Date |
|---|---|---|
| 1,400,510 | Asprooth | Dec. 20, 1921 |
| 1,569,081 | Ford | Jan. 12, 1926 |
| 1,875,767 | Simpson | Sept. 6, 1932 |
| 1,887,832 | Brown | Nov. 15, 1932 |
| 2,073,613 | Frudden et al. | Mar. 16, 1937 |
| 2,116,739 | Eason | May 10, 1938 |
| 2,352,086 | Eberhard | June 20, 1944 |
| 2,506,671 | Jacobi | May 9, 1950 |

FOREIGN PATENTS

| Number | Country | Date |
|---|---|---|
| 159,005 | Great Britain | Feb. 17, 1921 |